United States Patent [19]

Kitajima

[11] 4,379,975
[45] Apr. 12, 1983

[54] REVERSE FLOW COOLED DYNAMOELECTRIC MACHINE

[75] Inventor: Toshio Kitajima, Yokohama, Japan

[73] Assignee: Tokyo Shibaura Denki Kabushiki Kaisha, Kawasaki, Japan

[21] Appl. No.: 277,233

[22] Filed: Jun. 25, 1981

[30] Foreign Application Priority Data

Jun. 26, 1980 [JP] Japan ................................ 55-87162

[51] Int. Cl.³ .............................................. H02K 9/00
[52] U.S. Cl. ........................................ 310/59; 310/62
[58] Field of Search ...................... 310/52, 53, 55, 57, 310/58, 59, 60 R, 61, 62, 63, 64, 65, 259, 270, 260

[56] References Cited

U.S. PATENT DOCUMENTS

| 3,413,499 | 11/1968 | Barton | 310/64 |
| 3,739,208 | 6/1973 | Shartrand | 310/58 |
| 3,809,934 | 5/1974 | Baer et al. | 310/53 |
| 4,071,790 | 1/1978 | Darby et al. | 310/62 |
| 4,071,791 | 1/1978 | Armor et al. | 310/65 |
| 4,315,173 | 2/1982 | Calfo et al. | 310/53 |
| 4,324,993 | 4/1982 | Sato | 310/260 |

Primary Examiner—R. Skudy
Attorney, Agent, or Firm—Oblon, Fisher, Spivak, McClelland & Maier

[57] ABSTRACT

A reverse flow cooled dynamoelectric machine is provided with an annular baffle disposed in the gap thereof and spaced from stator core laminations at the end region for improving the cooling of these laminations. The baffle prevents heated gas flow from the end turn region of the rotor and gas from the cooling passages in the stator assembly from impinging in the gap.

7 Claims, 3 Drawing Figures

REVERSE FLOW COOLED DYNAMOELECTRIC MACHINE

BACKGROUND OF THE INVENTION

1. Field of the Invention

The present invention generally relates to a reverse flow cooled dynamoelectric machine, and more particularly to an improved arrangement for cooling the end regions of the stator of a reverse flow cooled dynamoelectric machine.

2. Description of the Prior Art

Dynamoelectric machines, such as large turbine-generators, have typically been cooled by a gas such as hydrogen flowing through the interior of the rotor, through the gas gap between the rotor and stator, and through passages between the stator laminations.

However, as the ratings of large turbine-generators increased, it was found that the heating produced in the end regions of the generator rotors became a limiting factor in the capablity of these machines. In order to cool these localized areas of excessive heating in the generator rotors, a reverse flow cooling scheme was adopted wherein cooling gas was pumped by the fan first to a gas cooler, the flow then being divided, a portion of it being pumped into the rotor at an end region thereof to cool the rotor, and the remainder of the gas being pumped through the cooling passages of the stator core.

Such a reverse flow ventilation scheme is described in U.S. Pat. No. 3,739,208 to Shartrand.

However, in such a reverse flow cooling scheme the ventilation loss in the gas gap not only increased, but also effective cooling was not achieved because of the impinging of the gas employed to cool the end portions of the stator with the gas employed to cool the end portions of the rotor.

The end portions, especially at the inner circumference of the stator, are heated due to stray load loss by stray flux from rotor and stator end portions. Therefore, it is a problem to effectively cool the end portion of the inner circumference (i.e. teeth) of the stator.

SUMMARY OF THE INVENTION

Accordingly, it is one object of this invention to provide an improved unique reverse flow cooled dynamoelectric machine in which flow can be strengthened to cool the teeth at end regions of the stator to eliminate the above-mentioned problem.

Briefly, in accordance with one aspect of this invention, a reverse flow cooled dynamoelectric machine is provided which includes a gas-tight casing containing cooling gas, a stator disposed within said casing and including a core of stacked laminations having spaced radially extending cooling passages disposed therein, a rotor disposed within said stator and spaced therefrom by a gap, said rotor including end turn regions and a gas passage disposed therein to cool said end turn regions of said stator, cooling means disposed in said casing, fan means disposed in said casing and adapted for the reverse flow circulation of said cooling gas, and baffle means disposed in said gap and spaced from said laminations so as to prevent the impinging of gas from the cooling passages disposed in said stator with gas from said end turn regions of rotor.

BRIEF DESCRIPTION OF THE DRAWINGS

A more complete appreciation of the invention will be readily obtained as the same becomes better understood by reference to the following detailed description when considered in connection with the accompanying drawings, wherein.

DETAILED DESCRIPTION OF THE PREFERRED EMBODIMENT

Figure 1:
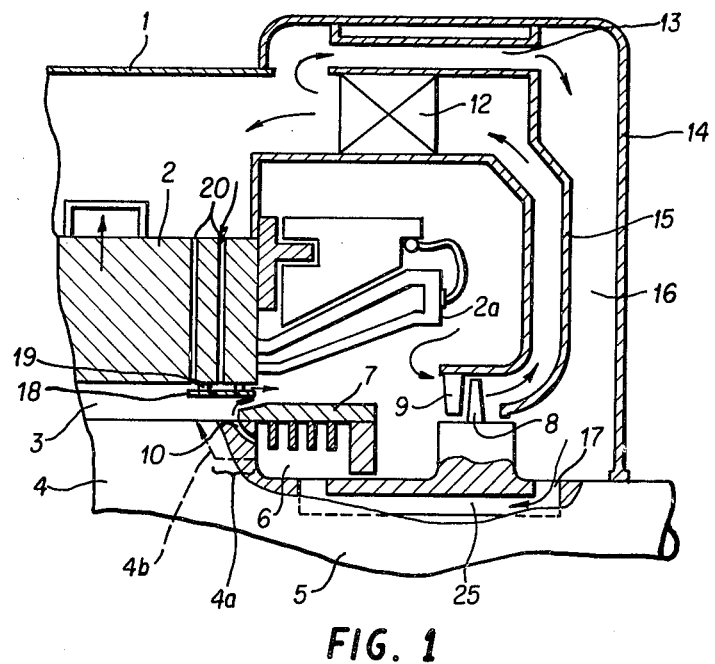
FIG. 1 is an elevated view in partial section of one end of a reverse flow cooled turbine-generator employing the improved cooling arrangement of the present invention.

Referring now to the drawings, wherein like reference numerals and letters designate identical or corresponding parts throughout the several views, and more particularly to FIG. 1 thereof, wherein one preferred embodiment of a reverse flow cooled dynamoelectric machine in accordance with this invention is shown, the machine is provided with a core of a stator assembly 2, including windings 2a, within a gas-tight casing 1 containing cooling gas.

A rotor 5 having a rotor assembly 4 is rotatably disposed within the stator assembly 2 and spaced from the stator assembly 2 by a gas gap 3.

The rotor 5 includes end turn regions 6 on both ends thereof, with each end turn region 6 being held at a predetermined position by a retaining ring 7.

A gas cooler 12 for supplying cooling gas to the core of the stator assembly 2, formed from a plurality of stacked laminations, and the end turn regions 6 of the rotor 5, is provided within the casing 1.

A fan 8 is attached to rotor 5 and draws cooling gas from one end of end duct 15 through a series of inlet guide vanes, one of which is shown at 9, pumping the cooling gas to the cooler 12 through end duct 15. One of the end turn regions 6 is communicated with an outlet 10 directed to the gas gap 3 as well as internal diagonal cooling passages, represented generally by dotted line arrows 4b, through a transition area 4a in rotor assembly 4.

To cool the end turn region 6 and transition area 4a, gas from the cooler 12 is pumped by fan 8 through tube 13, end chamber 16 formed between an end casing 14, end duct 15, an opening 17 provided on the end portion of rotor 5. The opening 17 is communicated with end turn region 6 held by retaining ring 7 through axially longitudinal passages 25 positioned under fan 8.

The axially longitudinal passages 25 are formed in the manner of slots having dovetails radially in crosssection which are pressed into the surface of the end of the rotor and wedges associated with the fan 8 are inserted into the slots so as to provide the longitudinal passages.

In operation, gas from cooler 12 is axially longitudinally distributed along and to the stator assembly 2 and rotor assembly 4 through the gas gap 3, and then is fed to fans 8 provided on both ends of rotor.

To prevent the impinging of the gas from radial passages in the core of stator assembly 2 and heated gas from the end turn region 6, a baffle 18 is disposed in gap 3 and held on stator winding wedges 19, extending from th core, by a screw bolt.

Figure 2:
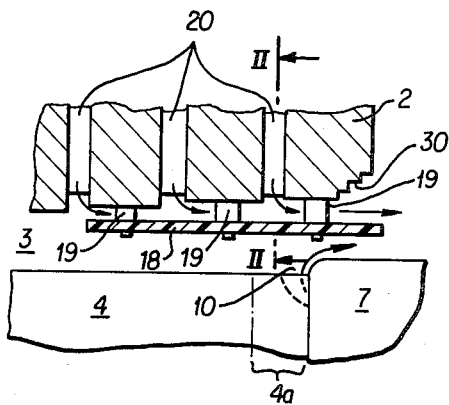
FIG. 2 is an enlarged view of the end region of the turbine-generator of FIG. 1.
Figure 3:
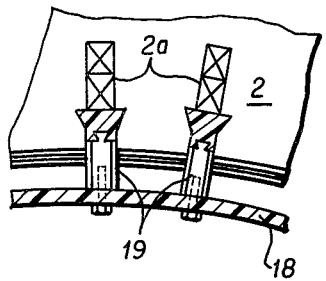
FIG. 3 is a sectional view of the end region of the turbine-generator shown in FIG. 2.

FIGS. 2 and 3 show the baffle of the present invention in a larger scale and in greater detail. Baffle 18 as shown in FIG. 3 is generally cylindrical and is formed from an electrically non-conducting substance such as a laminated fiber material. The wedges 19 each consist of two pieces having a dovetail coupling so as to be connected to each other and are formed from the same or a similar substance to that of baffle 18.

Such materials prevent any induced heating in the baffle and wedges which might otherwise result from the high concentration of stray flux in the end region of the machine.

In order to reliably attach the baffle to the wedges, either trying the baffle 18 to wedges 19 by glass fiber strands or a combination of bolting and trying may be utilized.

It should be noted that the baffle 18 is positioned in gas gap 3 so as to make heated gas from end turn region 6, through outlet 10, not impinge on the teeth portion of the stator core end portion which is heated by the stray load loss mentioned above.

As shown in FIGS. 2 and 3, in order to smoothly flow gas from cooling passages 20 of stator assembly 2 toward the end regions of the machine, the ventilation section formed between the teeth of the stator core end portion and baffle 18 is gradually increased toward the end regions.

As seen in FIG. 2, the end portions of stator core include radially foreshortened laminations 30 whose inboard ends are progressively farther removed from the axis of rotor assembly 4 so as to provide an array of progressively stepped laminations.

It should also be apparent that the circumferential widths of wedges 19 are gradually reduced toward the end regions, as shown in FIG. 3.

It should be understood that in accordance with the teachings of the present invention the cooling of the teeth of the stator core end portion is strengthened by preventing heated gas from end turn region 6 from impinging on the teeth of the stator core end portion, by providing the baffle.

Moreover, according to this invention, by providing the baffle, th pressure loss due to the impinging of gas from the cooling passage in the stator assembly and gas from end regions of rotor is eliminated.

Furthermore, since the ventilation section formed between the teeth and baffle is gradually enlarged toward the end regions, gas from the cooling passages in the stator assembly may smoothly flow toward the end regions of the dynamoelectric machine, whereby more effective cooling of the machine can be achieved.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A reverse flow cooled dynamoelectric machine comprising:
   a gas tight casing containing cooling gas;
   a stator disposed within said casing and including a core of stacked laminations having spaced radially extending cooling passages disposed therein;
   a rotor disposed within said stator and spaced therefrom by a gap, said rotor including end turn regions and a gas passage disposed in at least one said end turn region to cool said at least one end turn region of said rotor;
   cooling means disposed in said casing;
   fan means mounted on said rotor for circulating said cooling gas and including means for the reverse flow circulation of said cooling gas; and
   baffle means disposed between said cooling passages of at least one end turn region of said stator and said gas passage of said at least one end turn region of said rotor, said baffle means disposed in said gap and spaced from said laminations for forming a ventilation section so as to prevent the impinging of gas from the cooling passages disposed in said stator with gas from said end turn regions of rotor, the size of said ventilation section gradually increasing toward the axial ends of said machine.

2. A reverse flow cooled dynamoelectric machine comprising:
   a gas-tight casing containing cooling gas;
   a stator assembly disposed in said casing and including a core of stacked laminations having axially spaced radially extending cooling passages disposed therein;
   a rotor disposed within said stator assembly and spaced therefrom by a gas gap, said rotor including a gas passage disposal in at least one said end turn region to cool said at least one end turn region of said rotor;
   cooling means disposed in said casing;
   fan means mounted on said rotor for circulating said cooling gas and including means for the reverse flow circulation of said cooling gas;
   first circulating means for circulating a flow of cooling gas flowing from said cooling means through said radially extended cooling passages of said stator assembly and said gas gap;
   second circulating means for circulating a flow of cooling gas flowing from said cooling means through said gas passage disposed in said rotor; and
   baffle means disposed between said cooling passages of at least one end turn region of said stator and said gas passage of said at least one end turn region of said rotor, said baffle means disposed in said gas gap and spaced from said laminations to form a ventilating section for preventing the flow of said second circulating means from colliding with the flow of said first circulating means, the size of said ventilation section gradually increasing toward the axial ends of said machine.

3. The reverse flow cooled dynamoelectric machine recited in claim 1 or 2, wherein
   said baffle means consists of non-electrically conductive material.

4. A reverse flow cooled dynamoelectric machine recited in claim 1 or 2, wherein
   said baffle means includes attachment means for attaching said baffle means to the inner circumference of the stator core.

5. The reverse flow cooled dynamoelectric machine recited in claim 4, wherein the end portions of said stator core includes radially foreshortened laminations having inboard ends progressively farther removed from the axis of said rotor.

6. The reverse flow cooled dynamoelectric machine recited in claim 4, wherein the circumferential widths as axially spaced ones of said attachment means are different.

7. A reverse flow cooled dynamoelectric machine comprising:
- a gas-tight casing containing cooling gas;
- a stator disposed within said casing and including a core of stacked laminations having axially spaced radially extending cooling passages disposed therein, the end regions of said core including radially foreshortened laminations with radially inner ends progressively farther removed from the axis thereof to provide an array of progressively stepped laminations;
- a rotor disposed within said stator and spaced therefrom by a gas gap, said rotor including end turn regions and a gas passage disposed therein to cool said end turn regions of said rotor;
- cooling means disposed in said casing;
- fan means mounted on said rotor for the circulation of said cooling gas and including means for the reverse flow circulation of said cooling gas; and
- baffle means disposed between said cooling passages of at least one end turn region of said stator and said gas passage of said at least one end turn region of said rotor, said baffle means disposed in said gap and spaced from said stepped laminations for forming a ventilation section directing a flow of said cooling gas flowing axially outwardly from said gas gap towards said end regions and across said stepped laminations, said baffle including an annular member, whereby a flow of cooling gas flowing from said cooling means through said gas passage of said rotor is prevented from colliding with a flow of cooling gas flowing from the radially extending cooling passages of said core, the size of said ventilation section gradually increasing toward the axial ends of said machine.

* * * * *